US012689763B2

(12) United States Patent
Lin et al.

(10) Patent No.: US 12,689,763 B2
(45) Date of Patent: Jul. 21, 2026

(54) METHOD AND APPARATUS OF ADAPTIVE WEIGHTING FOR OVERLAPPED BLOCK MOTION COMPENSATION IN VIDEO CODING SYSTEM

(71) Applicant: MEDIATEK INC., Hsinchu City (TW)

(72) Inventors: Yu-Cheng Lin, Hsinchu City (TW);
Chun-Chia Chen, Hsinchu City (TW);
Tzu-Der Chuang, Hsinchu City (TW);
Chih-Wei Hsu, Hsinchu City (TW);
Ching-Yeh Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/860,230

(22) PCT Filed: Mar. 31, 2023

(86) PCT No.: PCT/CN2023/085422
§ 371 (c)(1),
(2) Date: Oct. 25, 2024

(87) PCT Pub. No.: WO2023/207511
PCT Pub. Date: Nov. 2, 2023

(65) Prior Publication Data
US 2025/0301170 A1　　Sep. 25, 2025

Related U.S. Application Data

(60) Provisional application No. 63/336,395, filed on Apr. 29, 2022.

(51) Int. Cl.
*H04N 19/583* (2014.01)
*H04N 19/105* (2014.01)
(Continued)

(52) U.S. Cl.
CPC ......... *H04N 19/583* (2014.11); *H04N 19/105* (2014.11); *H04N 19/137* (2014.11); *H04N 19/176* (2014.11)

(58) Field of Classification Search
None
See application file for complete search history.

(56) References Cited

U.S. PATENT DOCUMENTS 10,666,944 B2　5/2020　Navarrete Michelini
11,109,057 B2　8/2021　Lin
(Continued)

FOREIGN PATENT DOCUMENTS

CN　　107920248 A　　4/2018
CN　　110620930 A　　12/2019
(Continued)

OTHER PUBLICATIONS

International Search Report and Written Opinion dated Jul. 7, 2023, issued in application No. PCT/CN2023/085422.
(Continued)

*Primary Examiner* — Christopher G Findley
(74) *Attorney, Agent, or Firm* — McClure, Qualey & Rodack, LLP

(57)　　ABSTRACT

A method and apparatus for Overlapped Boundary Motion Compensation (OBMC). A current MV (Motion Vector) for the current block/subblock is determined and a neighbouring MV for a neighbouring block/subblock associated with the current block/subblock is determined. A number of lines to be applied for OBMC (Overlapped Block Motion Compensation), one or more weightings associated with the OMBC for the number of lines, or both are determined according to one or more boundary matching costs between the current block/subblock and the neighbouring block/subblock, MV difference between the current MV and the neighbouring
(Continued)

MV, or predicted luminance data associated with the current block/subblock. The OBMC is applied to at least one of the current block/subblock and the neighbouring block/subblock according to OBMC parameters comprising the number of lines, said one or more weightings, or both.

11 Claims, 5 Drawing Sheets

(51) Int. Cl.
    *H04N 19/137*         (2014.01)
    *H04N 19/176*         (2014.01)

(56)         References Cited

U.S. PATENT DOCUMENTS

| | | |
|---|---|---|
| 11,563,970 B2 | 1/2023 | Robert |
| 11,758,145 B2 | 9/2023 | Liu |

| | | | |
|---|---|---|---|
| 2019/0387251 A1 | 12/2019 | Lin | |
| 2021/0185353 A1* | 6/2021 | Xiu | H04N 19/55 |
| 2023/0283770 A1* | 9/2023 | Chang | H04N 19/105 |
| | | | 375/240.16 |

FOREIGN PATENT DOCUMENTS

| | | |
|---|---|---|
| CN | 110858901 A | 3/2020 |
| CN | 111989926 A | 11/2020 |
| CN | 111989927 A | 11/2020 |
| TW | 202008786 A | 2/2020 |

OTHER PUBLICATIONS

Chinese language office action dated Aug. 7, 2024, issued in application No. TW 112116017.

* cited by examiner

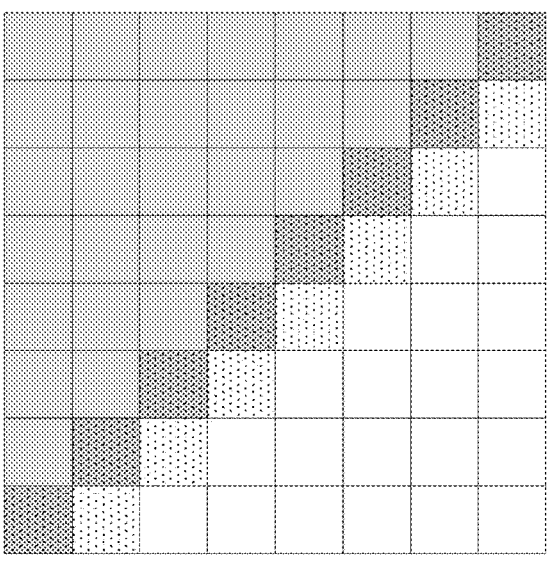
*Fig. 2*
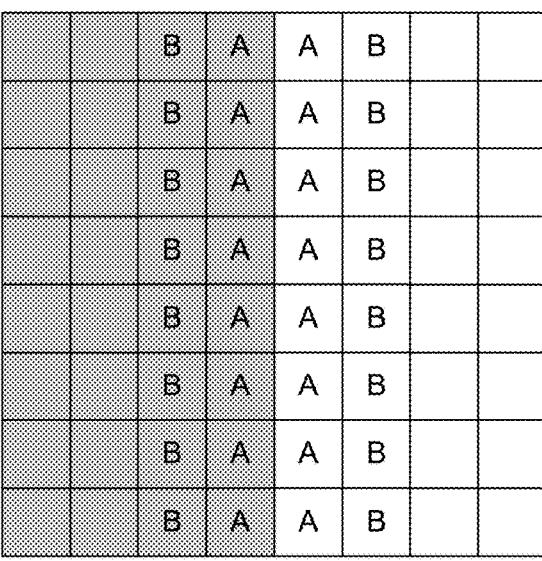
*Fig. 3A*                              *Fig. 3B*

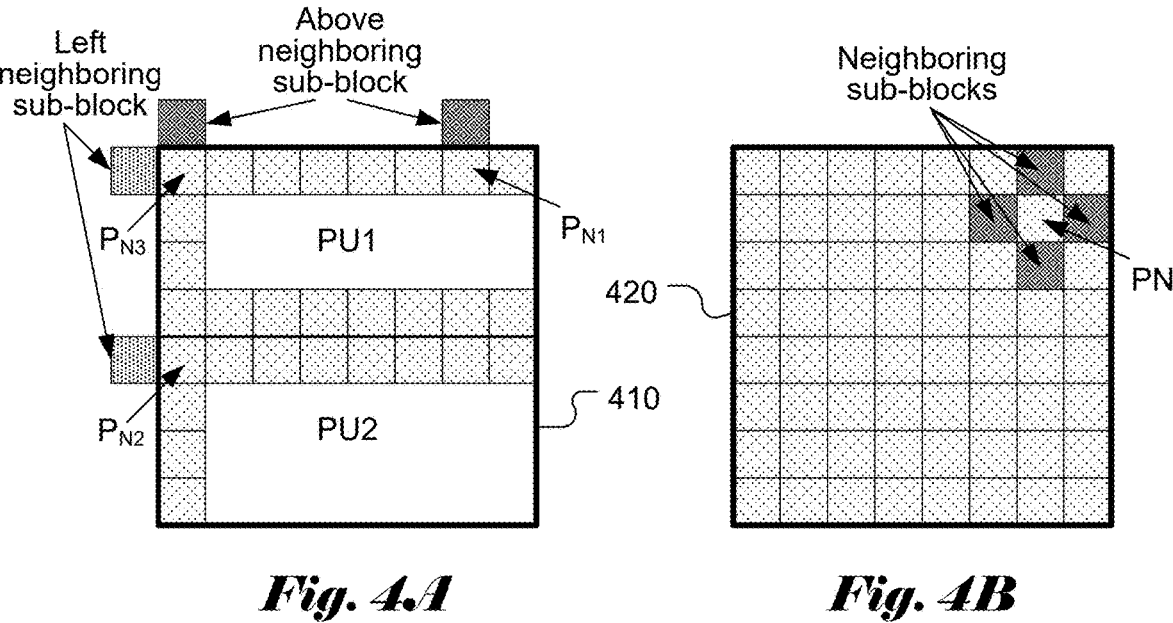
*Fig. 4A*          *Fig. 4B*
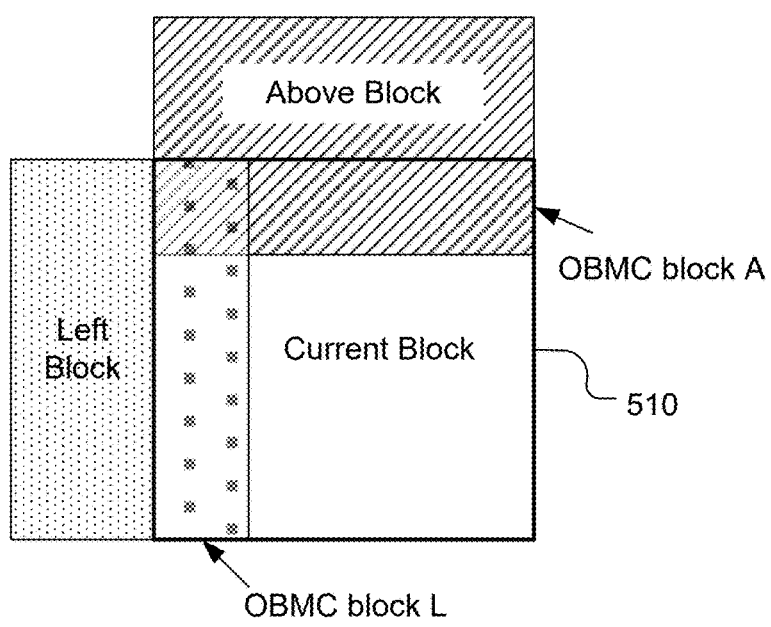
*Fig. 5*

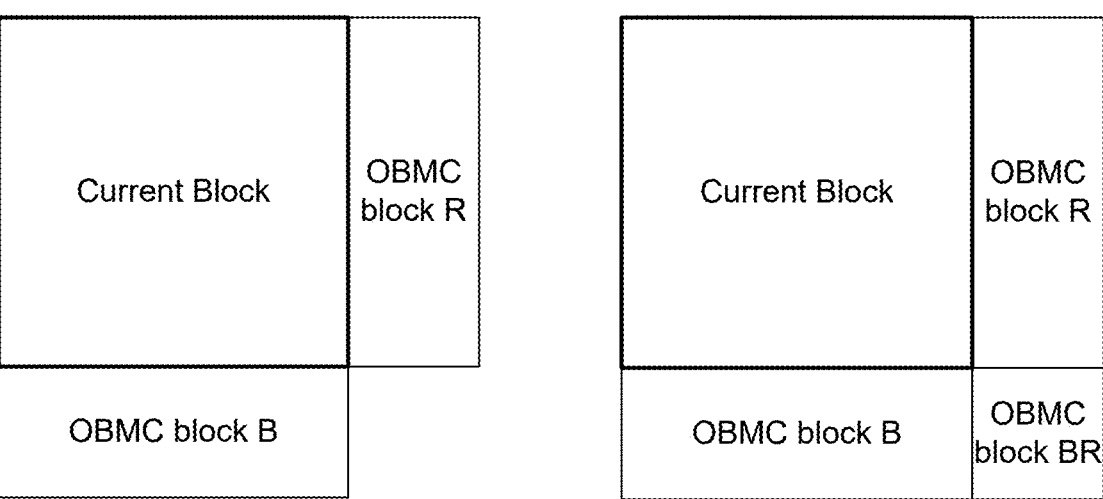
*Fig. 6A*           *Fig. 6B*
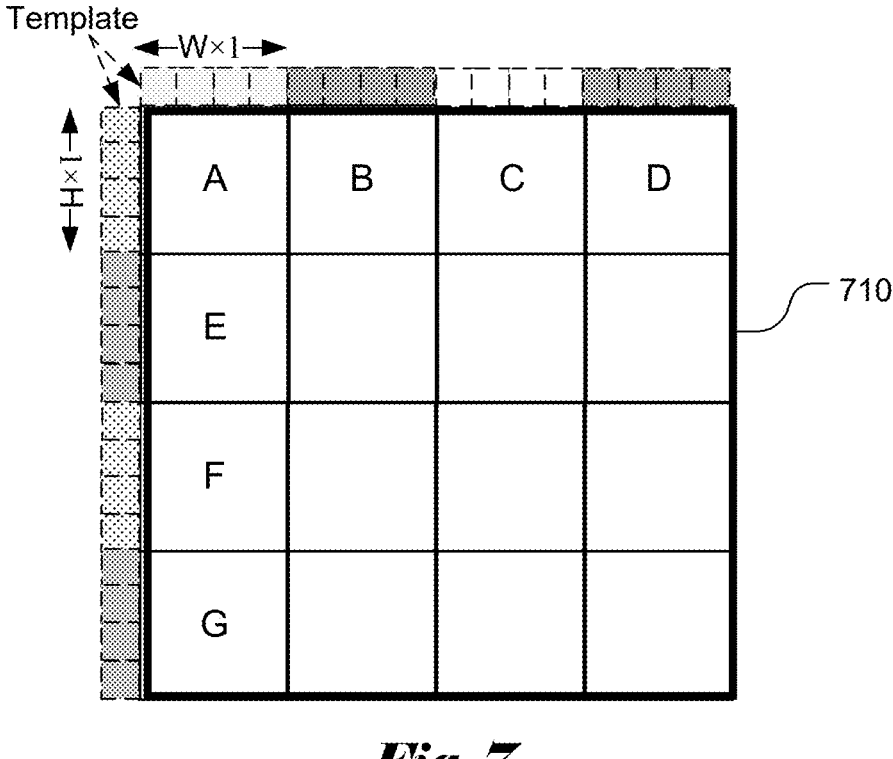
*Fig. 7*

METHOD AND APPARATUS OF ADAPTIVE WEIGHTING FOR OVERLAPPED BLOCK MOTION COMPENSATION IN VIDEO CODING SYSTEM

CROSS REFERENCE TO RELATED APPLICATIONS

The present invention is a non-Provisional application of and claims priority to U.S. Provisional Patent Application No. 63/336,395, filed on Apr. 29, 2022. The U.S. Provisional patent application is hereby incorporated by reference in its entirety.

FIELD OF THE INVENTION

The present invention relates to video coding. In particular, the present invention relates to adaptive design of the number of lines and weightings for the lines associated with the OBMC (Overlapped Block Motion Compensation) process in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Furthermore, various new coding tools have been proposed for consideration in the development of a new coding standard beyond the VVC. Among various new coding tools, some coding tools relevant to the present invention are reviewed as follows.

Overlapped Block Motion Compensation (OBMC)

Overlapped Block Motion Compensation (OBMC) is to find a Linear Minimum Mean Squared Error (LMMSE) estimate of a pixel intensity value based on motion-compensated signals derived from its nearby block motion vectors (MVs). From estimation-theoretic perspective, these MVs are regarded as different plausible hypotheses for its true motion, and to maximize coding efficiency, their weights should minimize the mean squared prediction error subject to the unit-gain constraint.

When High Efficient Video Coding (HEVC) was developed, several proposals were made using OBMC to provide coding gain. Some of them are described as follows.

In JCTVC-C251 (Peisong Chen, et. al., "Overlapped block motion compensation in TMuC", Joint Collaborative Team on Video Coding (JCT-VC) of ITU-T SG16 WP3 and ISO/IEC JTC1/SC29/WG11, 3rd Meeting: Guangzhou, CN, 7-15 Oct. 2010, Document: JCTVC-C251), OBMC was applied to geometry partition. In geometry partition, it is very likely that a transform block contains pixels belonging to different partitions. In geometry partition, since two different motion vectors are used for motion compensation, the pixels at the partition boundary may have large discontinuities that can produce visual artifacts similar to blockiness. This in turn decreases the transform efficiency. Let the two regions created by a geometry partition be denoted by region 1 and region 2. A pixel from region 1 (2) is defined to be a boundary pixel if any of its four connected neighbors (left, top, right, and bottom) belongs to region 2 (1). FIG. 2 shows an example where grey-dotted pixels belong to the boundary of region 1 (grey region) and white-dotted pixels belong to the boundary of region 2 (white region). If a pixel is a boundary pixel, the motion compensation is performed using a weighted sum of the motion predictions from the two motion vectors. The weights are ¾ for the prediction using the motion vector of the region containing the boundary pixel and ¼ for the prediction using the motion vector of the other region. The overlapping boundaries improve the visual quality of the reconstructed video while also providing BD-rate gain.

In JCTVC-F299 (Liwei Guo, et. al., "CE2: Overlapped Block Motion Compensation for 2N×N and N×2N Motion Partitions", Joint Collaborative Team on Video Coding (JCT-VC) of ITU-T SG16 WP3 and ISO/IEC JTC1/SC29/WG11, 6th Meeting: Torino, 14-22 Jul. 2011, Document: JCTVC-F299), OBMC was applied to symmetrical motion partitions. If a coding unit (CU) is partitioned into 2 2N×N or N×2N prediction units (PUs), OBMC is applied to the horizontal boundary of the two 2N×N prediction blocks, and the vertical boundary of the two N×2N prediction blocks. Since those partitions may have different motion vectors, the pixels at partition boundaries may have large discontinuities, which may generate visual artifacts and also reduce the transform/coding efficiency. In JCTVC-F299, OBMC is introduced to smooth the boundaries of motion partition.

FIGS. 3A-B illustrate an example of OBMC for 2N×N (FIG. 3A) and N×2N blocks (FIG. 3B). The gray pixels are pixels belonging to Partition 0 and white pixels are pixels belonging to Partition 1. The overlapped region in the luma component is defined as 2 rows (columns) of pixels on each side of the horizontal (vertical) boundary. For pixels which are 1 row (column) apart from the partition boundary, i.e., pixels labeled as A in FIGS. 3A-B, OBMC weighting factors are (¾, ¼). For pixels which are 2 rows (columns) apart from the partition boundary, i.e., pixels labeled as B in FIGS. 3A-B, OBMC weighting factors are (⅞, ⅛). For chroma components, the overlapped region is defined as 1 row (column) of pixels on each side of the horizontal (vertical) boundary, and the weighting factors are (¾, ¼).

Currently, the OBMC is performed after normal MC, and BIO is also applied in these two MC processes, separately. That is, the MC results for the overlapped region between two CUs or PUs is generated by another process not in the normal MC process. BIO (Bi-Directional Optical Flow) is then applied to refine these two MC results. This can help to skip the redundant OBMC and BIO processes, when two neighboring MVs are the same. However, the required bandwidth and MC operations for the overlapped region is increased compared to integrating OBMC process into the normal MC process. For example, the current PU size is 16×8, the overlapped region is 16×2, and the interpolation filter in MC is 8-tap. If the OBMC is performed after normal MC, then we need (16+7)×(8+7)+ (16+7)×(2+7)=552 reference pixels per reference list for the current PU and the related OBMC. If the OBMC operations are combined with normal MC into one stage, then only (16+7)×(8+2+7)=391 reference pixels per reference list for the current PU and the related OBMC. Therefore, in the following, in order to reduce the computation complexity or memory bandwidth of BIO, several methods are proposed, when BIO and OBMC are enabled simultaneously.

In the JEM (Joint Exploration Model), the OBMC is also applied. In the JEM, unlike in H.263, OBMC can be switched on and off using syntax at the CU level. When OBMC is used in the JEM, the OBMC is performed for all motion compensation (MC) block boundaries except for the right and bottom boundaries of a CU. Moreover, it is applied for both the luma and chroma components. In the JEM, a MC block corresponds to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as illustrated in FIGS. 4A-B.

When OBMC is applied to the current sub-block, besides current motion vectors, motion vectors of four connected neighboring sub-blocks, if available and are not identical to the current motion vector, are also used to derive the prediction block for the current sub-block. These multiple prediction blocks based on multiple motion vectors are combined to generate the final prediction signal of the current sub-block. Prediction block based on motion vectors of a neighboring sub-block is denoted as PNn, with n indicating an index for the neighboring above, below, left and right sub-blocks and prediction block based on motion vectors of the current sub-block is denoted as PC. FIG. 4A illustrates an example of OBMC for sub-blocks of the current CU 410 using a neighboring above sub-block (i.e., $P_{N1}$), left neighboring sub-block (i.e., $P_{N2}$), left and above sub-blocks i.e., $P_{N3}$). FIG. 4B illustrates an example of OBMC for the ATMVP mode, where block PN uses MVs from four neighboring sub-blocks for OBMC. When PN is based on the motion information of a neighboring sub-block that contains the same motion information as the current sub-block, the OBMC is not performed from PN. Otherwise, every sample of PN is added to the same sample in PC, i.e., four rows/columns of PN are added to PC. The weighting factors {¼, ⅛, 1/16, 1/32} are used for PN and the weighting factors {¾, ⅞, 15/16, 31/32} are used for PC. The exception are small MC blocks (i.e., when height or width of the coding block is equal to 4 or a CU is coded with sub-CU mode), for which only two rows/columns of PN are added to PC. In this case, weighting factors {¼, ⅛} are used for PN and weighting factors {¾, ⅞} are used for PC. For PN generated based on motion vectors of vertically (horizontally) neighboring sub-block, samples in the same row (column) of PN are added to PC with a same weighting factor.

In the JEM, for a CU with size less than or equal to 256 luma samples, a CU level flag is signaled to indicate whether OBMC is applied or not for the current CU. For the CUs with size larger than 256 luma samples or not coded with the AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

In JEM (Joint Exploration Model for VVC development), the OBMC is applied. For example, as shown in FIG. 5, for a current block 510, if the above block and the left block are coded in an inter mode, it takes the MV of the above block to generate an OBMC block A and takes the MV of the left block to generate an OBMC block L. The predictors of OBMC block A and OBMC block L are blended with the current predictors. To reduce the memory bandwidth of OBMC, it is proposed to do the above 4-row MC and left 4-column MC with the neighboring blocks. For example, when doing the above block MC, 4 additional rows are fetched to generate a block of (above block+OBMC block A). The predictors of OBMC block A are stored in a buffer for coding the current block. When doing the left block MC, 4 additional columns are fetched to generate a block of (left block+OBMC block L). The predictors of OBMC block L are stored in a buffer for coding the current block. Therefore, when doing the MC of the current block, four additional rows and four additional columns of reference pixels are fetched to generate the predictors of the current block, the OBMC block B, and the OBMC block R as shown in FIG. 6A (may also generate the OBMC block BR as shown in FIG. 6B). The OBMC block B and the OBMC block R are stored in buffers for the OBMC process of the bottom neighboring blocks and the right neighboring blocks.

For an M×N block, if the MV is not integer and a 8-tap interpolation filter is applied, a reference block with size of (M+7)×(N+7) is used for motion compensation. However, if the BIO and OBMC is applied, additional reference pixels are required, which increases the worst case memory bandwidth.

There are two different schemes to implement OBMC. In the first scheme, OBMC blocks are pre-generated when doing motion compensation for each block. These OBMC blocks will be stored in a local buffer for neighboring blocks. In the second scheme, the OBMC blocks are generated before the blending process of each block when doing OBMC.

In both schemes, several methods are proposed to reduce the computation complexity, especially for the interpolation filtering, and additional bandwidth requirement of OBMC.

Template Matching Based OBMC

Recently, a template matching-based OBMC scheme has been proposed (JVET-Y0076) to the emerging international coding standard. As shown in FIG. 7, for each top block with a size of 4×4 at the top CU boundary, the above template size equals to 4×1. In FIG. 7, box 710 corresponds to a CU. If N adjacent blocks have the same motion information, then the above template size is enlarged to 4N×1 since the MC operation can be processed at one time, which is in the same manner in ECM-OBMC. For each left block with a size of 4×4 at the left CU boundary, the left template size equals to 1×4 or 1×4N.

For each 4×4 top block (or N 4×4 blocks group), the prediction value of boundary samples is derived according to the following steps:

Take block A as the current block and its above neighbouring block AboveNeighbour_A for example. The operation for left blocks is conducted in the same manner.

First, three template matching costs (Cost1, Cost2, Cost3) are measured by SAD between the reconstructed samples of a template and its corresponding reference samples derived by MC process according to the following three types of motion information:

i. Cost1 is calculated according to A's motion information.

ii. Cost2 is calculated according to AboveNeighbour_A's motion information.

iii. Cost3 is calculated according to weighted prediction of A's and AboveNeighbour_A's motion information with weighting factors as $\frac{3}{4}$ and $\frac{1}{4}$ respectively.

Second, choose one out of three approaches to calculate the final prediction results of boundary samples by comparing Cost1, Cost2 and Cost 3.

The original MC result using current block's motion information is denoted as Pixel1, and the MC result using neighbouring block's motion information is denoted as Pixel2. The final prediction result is denoted as NewPixel.

If Cost1 is minimum, then NewPixel(i, j)=Pixel1(i, j).

If Cost2 is minimum, then blending mode 1 is used.

For luma blocks, the number of blending pixel rows is 4.

$$NewPixel(i, 0) = (26 \times Pixel1(i, 0) + 6 \times Pixel2(i, 0) + 16) \gg 5$$

$$NewPixel(i, 1) = (7 \times Pixel1(i, 1) + Pixel2(i, 1) + 4) \gg 3$$

$$NewPixel(i, 2) = (15 \times Pixel1(i, 2) + Pixel2(i, 2) + 8) \gg 4$$

$$NewPixel(i, 3) = (31 \times Pixel1(i, 3) + Pixel2(i, 3) + 16) \gg 5$$

For chroma blocks, the number of blending pixel rows is 1.

$$NewPixel(i, 0) = (26 \times Pixel1(i, 0) + 6 \times Pixel2(i, 0) + 16) \gg 5$$

If Cost3 is minimum, then then blending mode 2 is used. For luma blocks, the number of blending pixel rows is 2.

$$NewPixel(i, 0) = (15 \times Pixel1(i, 0) + Pixel2(i, 0) + 8) \gg 4$$

$$NewPixel(i, 1) = (31 \times Pixel1(i, 1) + Pixel2(i, 1) + 16) \gg 5$$

For chroma blocks, the number of blending pixel rows/columns is 1.

$$NewPixel(i, 0) = (15 \times Pixel1(i, 0) + Pixel2(i, 0) + 8) \gg 4$$

In the present application, adaptive OBMC methods are disclosed to improve the coding efficiency.

BRIEF SUMMARY OF THE INVENTION

A method and apparatus for video coding using OBMC are disclosed. According to the method, input data associated with a current block/subblock are received, wherein the input data comprise pixel data for the current block/subblock to be encoded at an encoder side or encoded data associated with the current block/subblock to be decoded at a decoder side. A current MV (Motion Vector) for the current block/subblock is determined and also a neighbouring MV for a neighbouring block/subblock associated with the current block/subblock is determined. A number of lines to be applied for OBMC (Overlapped Block Motion Compensation), one or more weightings associated with the OMBC for the number of lines, or both are determined according to one or more boundary matching costs between the current block/subblock and the neighbouring block/subblock, MV difference between the current MV and the neighbouring MV, or predicted luminance data associated with the current block/subblock. The OBMC is applied to at least one of the current block/subblock and the neighbouring block/subblock according to OBMC parameters comprising the number of lines, said one or more weightings, or both.

In one embodiment, the number of lines, said one or more weightings or both are determined by comparing the MV difference with a threshold. In one embodiment, first weighting is used if the MV difference is smaller than the threshold and second weighting is used if the MV difference is greater than the threshold. In one embodiment, the first weighting is larger than the second weighting. In another embodiment, the second weighting is larger than the first weighting.

In one embodiment, the number of lines, said one or more weightings or both are determined according to said one or more boundary matching costs comprising a first boundary matching cost and a second boundary matching cost. The first boundary matching cost is calculated between one or more first predicted or reconstructed samples of the current block/subblock and one or more reconstructed samples of the neighbouring block/subblock, and the second boundary matching cost is calculated between one or more second predicted or reconstructed samples of the current block/subblock and said one or more reconstructed samples of the neighbouring block/subblock. Said one or more first predicted or reconstructed samples of the current block/subblock are determined using the current MV and said one or more second predicted or reconstructed samples of the current block/subblock are determined using the neighbouring MV.

In one embodiment, said one or more weightings comprise a first weighting and a second weighting for said one or more first predicted or reconstructed samples of the current block/subblock and said one or more second predicted or reconstructed samples of the current block/subblock respectively to form one or more final predicted or reconstructed samples of the current block/subblock, and wherein a ratio of the first weighting and the second weighting corresponds to the ratio of the second boundary matching cost and the first boundary matching cost. In one embodiment, the number of lines, said one or more weightings or both are determined in response to comparing one of the first boundary matching cost and the second boundary matching cost with a threshold. In one embodiment, if said one of the first boundary matching cost and the second boundary matching cost is smaller than the threshold, the number of lines, said one or more weightings or both are reduced or increased accordingly. In one embodiment, if said one of the first boundary matching cost and the second boundary matching cost is greater than the threshold, the number of lines, said one or more weightings or both are reduced or increased accordingly.

In one embodiment, the threshold is dependent on block width or height, aspect ratio or block shape of the current block/subblock, the current MV, the neighbouring MV, weighted or unweighted MV difference, boundary similarity, predictor luminance signal, MV gradient at one or more boundaries between the current block/subblock and the neighbouring block/subblock, cost metrics, or a combination thereof.

In one embodiment, the number of lines, said one or more weightings or both are determined according to the predicted luminance data associated with the current block/subblock. In one embodiment, the predicted luminance data corresponds to an average value of the current block/subblock.

BRIEF DESCRIPTION OF THE DRAWINGS

FIG. 2 illustrates an example of overlapped motion compensation for geometry partitions.

FIGS. 3A-B illustrate an example of OBMC for 2N×N (FIG. 3A) and N×2N blocks (FIG. 3B).

FIG. 4A illustrate an example of the sub-blocks that OBMC is applied, where the example includes subblocks at a CU/PU boundary.

FIG. 4B illustrate an example of the sub-blocks that OBMC is applied, where the example includes subblocks coded in the AMVP mode.

FIG. 5 illustrate an example of the OBMC processing using neighboring blocks from above and left for the current block.

FIG. 6A illustrate an example of the OBMC processing for the right and bottom part of the current block using neighboring blocks from right and bottom.

FIG. 6B illustrate an example of the OBMC processing for the right and bottom part of the current block using neighboring blocks from right, bottom and bottom-right.

FIG. 7 illustrates an example of Template Matching based OBMC where, for each top block with a size of 4×4 at the top CU boundary, the above template size equals to 4×1.

DETAILED DESCRIPTION OF THE INVENTION

Figure 1A:
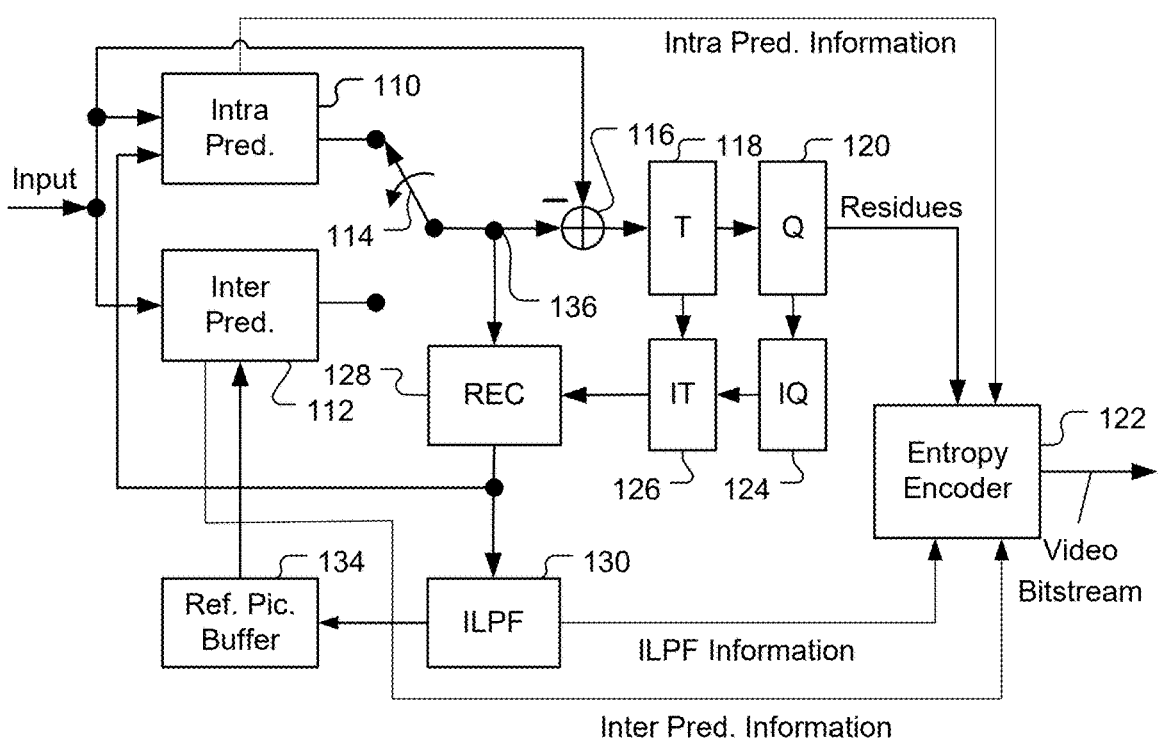
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

A new method of adaptive weighting in OBMC blending is disclosed. In this method, when OBMC is applied to the current block, the number of lines or the weighting for the lines in OBMC may be changed adaptively, such as according to its block width or height, aspect ratio, block shape, MV of the current block/subblock, MV of neighbouring block/subblock, weighted or unweighted MV difference between the current subblock and the neighboring block, boundary similarity, predictor luminance signal, MV gradient at the boundary, cost metrics, or a combination thereof. The number of lines or weighting for lines in OBMC can be changed according to some specific characteristics in CUs, or it can always be non-modified regardless of the CU characteristics.

In one embodiment, when the current block area (i.e., block width×block height) is smaller than or larger than a threshold, the number of lines or the weighting for the lines in OBMC will be reduced or increased accordingly.

In another embodiment, when the aspect ratio of the current block is smaller than or larger than a threshold, the number of lines or the weighting for the lines in OBMC will be reduced or increased accordingly. For example, a first weighting can be used if the MV difference is smaller than the threshold and a second weighting can be used if the MV difference is greater than the threshold. The first weighting is larger than the second weighting in one example and the second weighting is larger than the first weighting in another example.

In another embodiment, MV of the current subblock will be compared with the MV of neighboring block to get the MV difference. If the MV difference is smaller than or larger than a threshold, the number of lines or the weighting of lines in OBMC will be reduced or increased accordingly. In another example, after getting the MV difference, the MV difference is weighted by multiplying with another value to get a weighted MV difference, and the weighted MV difference is then compared with the threshold.

In another embodiment, in order to measure the boundary similarity, when it is determined to perform OBMC at the current subblock, firstly the boundary matching cost is calculated by comparing current samples and neighboring samples. The current samples can be predicted samples or reconstructed samples. Similarly, the neighbouring samples can be neighbouring predicted samples or neighbouring reconstructed samples. To determine the number of lines or the weighting for the lines in OBMC, the boundary matching cost may be utilized as follows:

Cost 1=BoundaryMatchingCost(Neighboring Reconstruction,Current Predictor or Current Reconstruction)

Cost 2=BoundaryMatchingCost(Neighboring Reconstruction,Neighboring Predictor)

Weighting=Cost 1/(Cost 1+Cost 2) for the neighboring predictor

Weighting=Cost 2/(Cost 1+Cost 2) for the current predictor

In the above, the predicted or reconstructed samples for the current block or subblock are derived based on the MV of the current block or subblock. The neighboring predictor refers to the predictor generated based on the MV of the neighbouring block or subblock. As can be seen, a ratio of the weighting for the neighboring predictor to the weighting for the current predictor corresponds to the ratio of the boundary matching cost 1 to the boundary matching cost 2.

In another example, instead of always using weighting in terms of Cost 1 and Cost 2, one cost from Cost 1 and Cost 2 can be selected and compared with a threshold. If the selected cost is smaller than or larger than a threshold, the number of lines or the weighting for the lines in OBMC will be reduced or increased accordingly. In another embodiment, the boundary matching cost or template matching cost is calculated. Different comparisons can be applied to the cost and the threshold. For example, the comparison may correspond to "smaller than or equal to", "smaller than", "larger than or equal to", or "larger than". Depending on the comparison result, the blending line number or blending weighting can be reduced or increased. The threshold can be dependent on the block width or height, aspect ratio, block shape, MV of the current block/subblock, MV of the neighbouring block/subblock, weighted or unweighted MV difference between current subblock and neighboring block, boundary similarity, predictor luminance signal, MV gradient at the boundary, cost metrics, or a combination thereof.

In another embodiment, when it is determined to perform OBMC for the current subblock, firstly the luminance signal of the current predictor is calculated. If the luminance value (or the average value of the current block/subblock) is smaller or larger than a threshold, the number of lines or the weighting for the lines in OBMC will be reduced or increased accordingly.

In another embodiment, when it is determined to perform OBMC for the current subblock, firstly spatial gradients are used to calculate sample-level offset to get the MV gradient. If the MV gradient is smaller or larger than a threshold, the number of lines or the weighting of lines in OBMC will be reduced or increased accordingly. In another example, when the comparison with the threshold is performed, optical flow derivation will be applied based on the MV gradient.

Figure 1B:
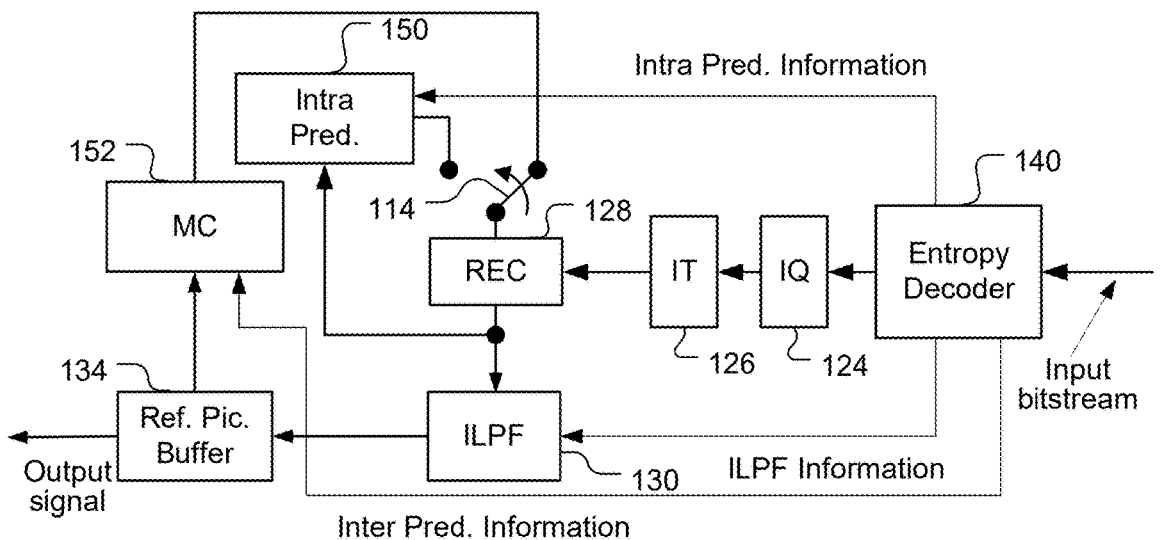
FIG. 1B illustrates a corresponding decoder for the encoder in FIG. 1A.

Any of the foregoing proposed OBMC methods can be implemented in encoders and/or decoders. For example, in the encoder side, the required processing can be implemented in a predictor derivation module, such as part of the Inter-Pred. unit 112 as shown in FIG. 1A. However, the encoder may also use additional processing unit to implement the required processing. For the decoder side, the required processing can be implemented in a predictor derivation module, such as part of the MC unit 152 as shown in FIG. 1B. However, the decoder may also use additional processing unit to implement the required processing. While the Inter-Pred. 112 and MC 152 are shown as individual processing units, they may correspond to executable software or firmware codes stored on a media, such as hard disk or flash memory, for a CPU (Central Processing Unit) or programmable devices (e.g. DSP (Digital Signal Processor) or FPGA (Field Programmable Gate Array)). Alternatively, any of the proposed methods can be implemented as a circuit coupled to the predictor derivation module of the encoder and/or the predictor derivation module of the decoder, so as to provide the information needed by the predictor derivation module.

Figure 8:
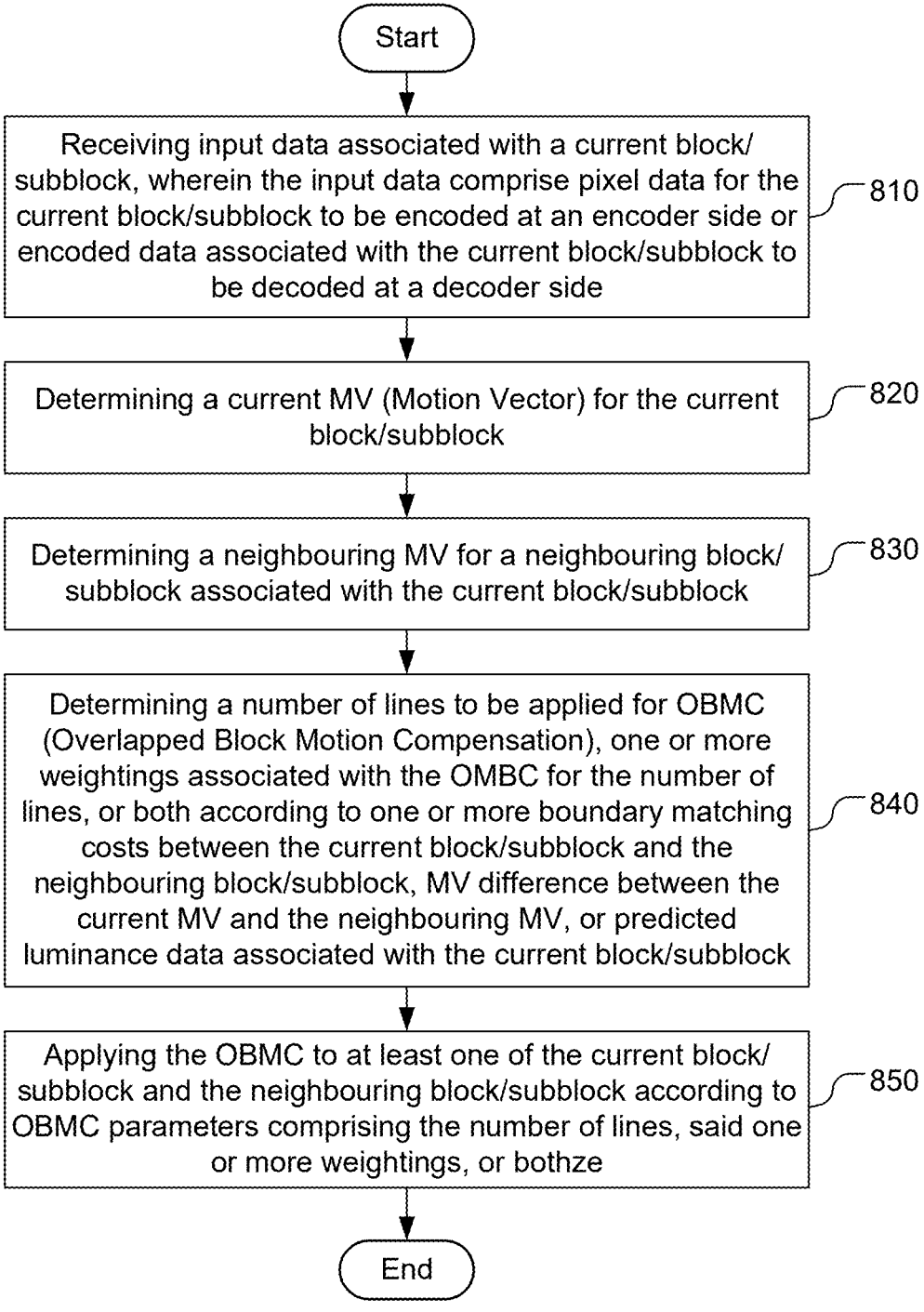
FIG. 8 illustrates a flowchart of an exemplary Overlapped Block Motion Compensation (OBMC) process in a video coding system according to an embodiment of the present invention.

FIG. 8 illustrates a flowchart of an exemplary Overlapped Block Motion Compensation (OBMC) process in a video coding system according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to the method, input data associated with a current block is received in step 810, wherein the input data comprise pixel data for the current block to be encoded at an encoder side or coded data associated with the current block to be decoded at a decoder side. A current MV (Motion Vector) for the current block/subblock is determined in step 820. A neighbouring MV for a neighbouring block/subblock associated with the current block/subblock is determined in step 830. A number of lines to be applied for OBMC (Overlapped Block Motion Compensation), one or more weightings associated with the OMBC for the number of lines, or both are determined according to one or more boundary matching costs between the current block/subblock and the neighbouring block/subblock, MV difference between the current MV and the neighbouring MV, or predicted luminance data associated with the current block/subblock in step 840. The OBMC is applied to at least one of the current block/subblock and the neighbouring block/subblock according to OBMC parameters comprising the number of lines, said one or more weightings, or both in step 850.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
   receiving input data associated with a current block/subblock, wherein the input data comprise pixel data for the current block/subblock to be encoded at an encoder side or encoded data associated with the current block/subblock to be decoded at a decoder side;
   determining a current MV (Motion Vector) for the current block/subblock;
   determining a neighbouring MV for a neighbouring block/subblock associated with the current block/subblock;
   determining a number of lines to be applied for OBMC (Overlapped Block Motion Compensation), one or more weightings associated with the OMBC for the number of lines, or both according to one or more boundary matching costs between the current block/subblock and the neighbouring block/subblock, MV difference between the current MV and the neighbouring MV, or predicted luminance data associated with the current block/subblock; and
   applying the OBMC to at least one of the current block/subblock and the neighbouring block/subblock according to OBMC parameters comprising the number of lines, said one or more weightings, or both, wherein the number of lines, said one or more weightings or both are determined by comparing the MV difference with a threshold, wherein first weighting is used if the MV difference is smaller than the threshold and second weighting is used if the MV difference is greater than the threshold, wherein the first weighting is larger than the second weighting or the second weighting is larger than the first weighting.

2. The method of claim 1, wherein the number of lines, said one or more weightings or both are determined according to said one or more boundary matching costs comprising a first boundary matching cost and a second boundary matching cost, and wherein the first boundary matching cost is calculated between one or more first predicted or reconstructed samples of the current block/subblock and one or more reconstructed samples of the neighbouring block/subblock, and the second boundary matching cost is calculated between one or more second predicted or reconstructed samples of the current block/subblock and said one or more reconstructed samples of the neighbouring block/subblock, and wherein said one or more first predicted or reconstructed samples of the current block/subblock are determined using the current MV and said one or more second predicted or reconstructed samples of the current block/subblock are determined using the neighbouring MV.

3. The method of claim 2, wherein said one or more weightings comprise a first weighting and a second weighting for said one or more first predicted or reconstructed samples of the current block/subblock and said one or more second predicted or reconstructed samples of the current block/subblock respectively to form one or more final predicted or reconstructed samples of the current block/subblock, and wherein a ratio of the first weighting to the second weighting corresponds to the ratio of the second boundary matching cost to the first boundary matching cost.

4. The method of claim 2, wherein the number of lines, said one or more weightings or both are determined in response to comparing one of the first boundary matching cost and the second boundary matching cost with a threshold.

5. The method of claim 4, wherein if said one of the first boundary matching cost and the second boundary matching cost is smaller than the threshold, the number of lines, said one or more weightings or both are reduced or increased accordingly.

6. The method of claim 4, wherein if said one of the first boundary matching cost and the second boundary matching cost is greater than the threshold, the number of lines, said one or more weightings or both are reduced or increased accordingly.

7. The method of claim 4, wherein the threshold is dependent on block width or height, aspect ratio or block shape of the current block/subblock, the current MV, the neighbouring MV, weighted or unweighted MV difference, boundary similarity, predictor luminance intensity, MV gradient at one or more boundaries between the current block/subblock and the neighbouring block/subblock, cost metrics, or a combination thereof.

8. The method of claim 1, wherein the number of lines, said one or more weightings or both are determined according to the predicted luminance data associated with the current block/subblock.

9. The method of claim 8, wherein the predicted luminance data corresponds to an average value of the current block/subblock.

10. An apparatus for video coding, the apparatus comprising one or more electronics or processors arranged to:

receive input data associated with a current block/subblock, wherein the input data comprise pixel data for the current block/subblock to be encoded at an encoder side or encoded data associated with the current block/subblock to be decoded at a decoder side;

determine a current MV (Motion Vector) for the current block/subblock;

determine a neighbouring MV for a neighbouring block/subblock associated with the current block/subblock;

determine a number of lines to be applied for OBMC (Overlapped Block Motion Compensation), one or more weightings associated with the OMBC for the number of lines, or both according to one or more boundary matching costs between the current block/subblock and the neighbouring block/subblock, MV difference between the current MV and the neighbouring MV, or predicted luminance data associated with the current block/subblock; and apply the OBMC to at least one of the current block/subblock and the neighbouring block/subblock according to OBMC parameters comprising the number of lines, said one or more weightings, or both-, wherein the number of lines, said one or more weightings or both are determined by comparing the MV difference with a threshold, wherein first weighting is used if the MV difference is smaller than the threshold and second weighting is used if the MV difference is greater than the threshold, wherein the first weighting is larger than the second weighting or the second weighting is larger than the first weighting.

11. A method of video coding, the method comprising:

receiving input data associated with a current block/subblock, wherein the input data comprise pixel data for the current block/subblock to be encoded at an encoder side or encoded data associated with the current block/subblock to be decoded at a decoder side;

determining a current MV (Motion Vector) for the current block/subblock;

determining a neighbouring MV for a neighbouring block/subblock associated with the current block/subblock;

determining a number of lines to be applied for OBMC (Overlapped Block Motion Compensation), one or more weightings associated with the OMBC for the number of lines, or both according to one or more boundary matching costs between the current block/subblock and the neighbouring block/subblock, MV difference between the current MV and the neighbouring MV, or predicted luminance data associated with the current block/subblock; and applying the OBMC to at least one of the current block/subblock and the neighbouring block/subblock according to OBMC parameters comprising the number of lines, said one or more weightings, or both, wherein the number of lines, said one or more weightings or both are determined according to the predicted luminance data associated with the current block/subblock.

* * * * *